(12) United States Patent
Nichols et al.

(10) Patent No.: US 10,488,494 B2
(45) Date of Patent: Nov. 26, 2019

(54) SENSOR APPARATUS

(71) Applicant: Ford Global Technologies, LLC, Dearborn, MI (US)

(72) Inventors: Mark Edward Nichols, Saline, MI (US); Cindy Anne Peters, Canton, MI (US); Sabrina Louise Peczonczyk, Ann Arbor, MI (US); Kerrie Nikaido Holguin, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 299 days.

(21) Appl. No.: 15/477,511

(22) Filed: Apr. 3, 2017

(65) Prior Publication Data
US 2018/0284233 A1 Oct. 4, 2018

(51) Int. Cl.
| *G01S 7/48* | (2006.01) |
| *G01S 7/481* | (2006.01) |
| *G01S 17/93* | (2006.01) |
| *B60R 11/04* | (2006.01) |
| B60R 11/00 | (2006.01) |
| G05D 1/02 | (2006.01) |
| G01S 13/93 | (2006.01) |

(52) U.S. Cl.
CPC ............ *G01S 7/4813* (2013.01); *B60R 11/04* (2013.01); *G01S 17/936* (2013.01); *B60R 2011/004* (2013.01); *G01S 2013/9385* (2013.01); *G05D 1/0231* (2013.01)

(58) Field of Classification Search
CPC ........ H05K 999/99; G01C 3/02; G01S 17/10; G01S 17/42; G01S 17/66; G01S 17/87; G01S 17/89; G01S 17/936; G01S 7/4808; G01S 7/4813; G01S 7/4815; G01S 7/4816; G01S 7/4817; G01S 17/93; G01S 17/023

See application file for complete search history.

(56) References Cited

U.S. PATENT DOCUMENTS

| 4,716,601 A | * | 1/1988 | McNeal ................. A61F 9/025 2/434 |
| 7,084,744 B2 | | 8/2006 | Li |
| 8,899,761 B2 | | 12/2014 | Tonar et al. |
| 9,400,327 B2 | | 7/2016 | Kupfernagel |
| 2015/0041510 A1 | | 2/2015 | Frenzel et al. |

(Continued)

FOREIGN PATENT DOCUMENTS

| CN | 102632844 B | 3/2014 |
| DE | 20221683 U1 | 1/2007 |

(Continued)

OTHER PUBLICATIONS

GB Search Report dated Sep. 14, 2018 re GB Appl. 1805335.5.

(Continued)

*Primary Examiner* — Luke D Ratcliffe
(74) *Attorney, Agent, or Firm* — Frank A. MacKenzie; Bejin Bieneman PLC

(57) ABSTRACT

A sensor apparatus includes a housing, a LIDAR sensor attached to the housing, a window attached to the housing, and a film covering the window and removable from the window. The window may be cylindrical. The film may be a first film, and the sensor apparatus may include a second film covering the first film and removable from the first film.

16 Claims, 3 Drawing Sheets

(56) References Cited

U.S. PATENT DOCUMENTS

| | | | | |
|---|---|---|---|---|
| 2015/0241761 A1* | 8/2015 | Llewellyn | ............ | G03B 17/56 |
| | | | | 396/448 |
| 2016/0047901 A1 | 2/2016 | Pacala et al. | | |
| 2016/0223663 A1 | 8/2016 | Schmalenberg et al. | | |
| 2016/0282468 A1 | 9/2016 | Gruver et al. | | |
| 2017/0147986 A1* | 5/2017 | Huo | ................ | G06Q 10/1095 |
| 2018/0217242 A1* | 8/2018 | Lombrozo | ............ | G01S 7/4813 |

FOREIGN PATENT DOCUMENTS

| | | | | |
|---|---|---|---|---|
| DE | 102006008718 A1 | 8/2007 | | |
| DE | 102009042285 A1 | 3/2011 | | |
| EP | 2575000 A2 | 4/2013 | | |
| WO | 2010024683 A1 | 3/2010 | | |
| WO | 2014148915 A1 | 9/2014 | | |
| WO | WO2014/148915 | * 9/2014 | ............ | G01C 3/00 |
| WO | 20160580390 A1 | 4/2016 | | |

OTHER PUBLICATIONS

Final Office Action dated Nov. 29, 2018, U.S. Appl. No. 15/477,432, filed Apr. 3, 2017.
GB Search Report dated Sep. 18, 2018 re GB Appl. No. 1805315.7.

* cited by examiner

SENSOR APPARATUS

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

A sensor apparatus includes a housing, a LIDAR sensor attached to the housing, a window attached to the housing, and a film covering the window and removable from the window.

The window may be cylindrical. The housing may be a first housing, and the sensor apparatus may include a second housing. The window may be attached to the second housing. The first and second housings may be cylindrical. A diameter of the window may be less than a diameter of the first housing. The diameter of the window may be less than a diameter of the second housing.

The film may be a first film, and the sensor apparatus may include a second film covering the first film and removable from the first film. The sensor apparatus may include a third film covering the second film and removable from the second film.

The film may be a cling film.

The film may include adhesive attaching the film to the window. The adhesive may be bonded more strongly to the film than to the window.

The film may include a hydrophobic surface treatment.

The sensor apparatus may include a vehicle body, and the housing may be mounted to the vehicle body.

A vehicle includes a vehicle body, a housing mounted to the vehicle body, a LIDAR sensor attached to the housing, a window attached to the housing, and a film covering the window and removable from the window.

The vehicle body may include an A pillar, and the vehicle may include an arm extending from the A pillar to the housing. The window may be cylindrical. The housing may be a first housing, and the vehicle may include a second housing. The window may be attached to the second housing.

The film may be a first film, and the vehicle may include a second film covering the first film and removable from the first film.

The film may be a cling film.

The film may include adhesive attaching the film to the window.

The sensor apparatus may be exposed to an external environment that may be harsh. For example, the sensor apparatus may experience hail, dust, impacts from road debris, extensive sun exposure, etc. The sensor apparatus allows for at least some damage from the environment to occur to the film instead of to the window. The film can be removed without replacing the window or other components of the sensor apparatus. The other components of the sensor apparatus, such as the sensor itself, may be considerably more expensive than the film. Allowing removal of the film may lower the cost of ownership of a vehicle incorporating the sensor apparatus.

Figure 1:
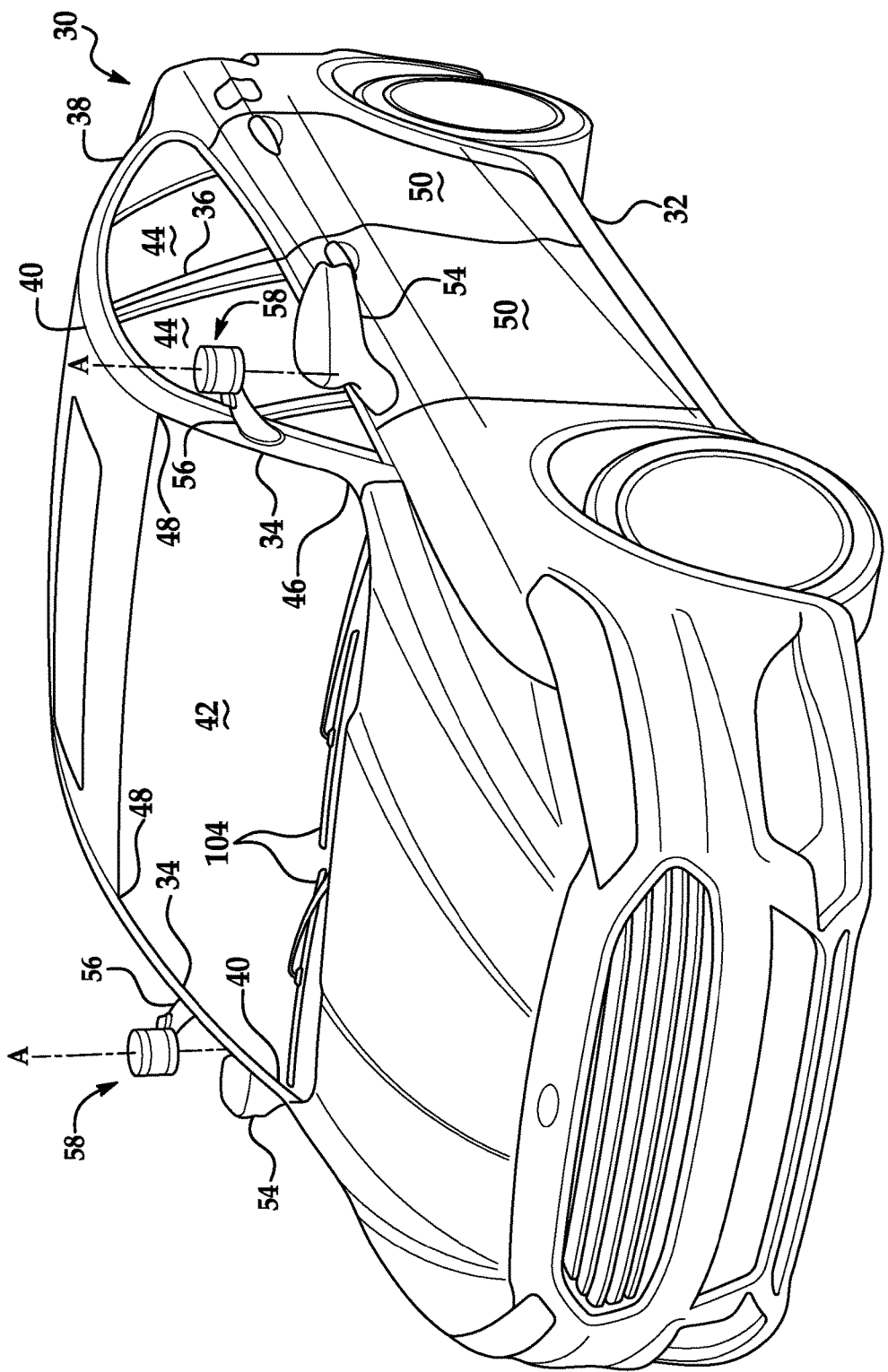
FIG. 1 is a perspective view of an example vehicle.
Figure 2:
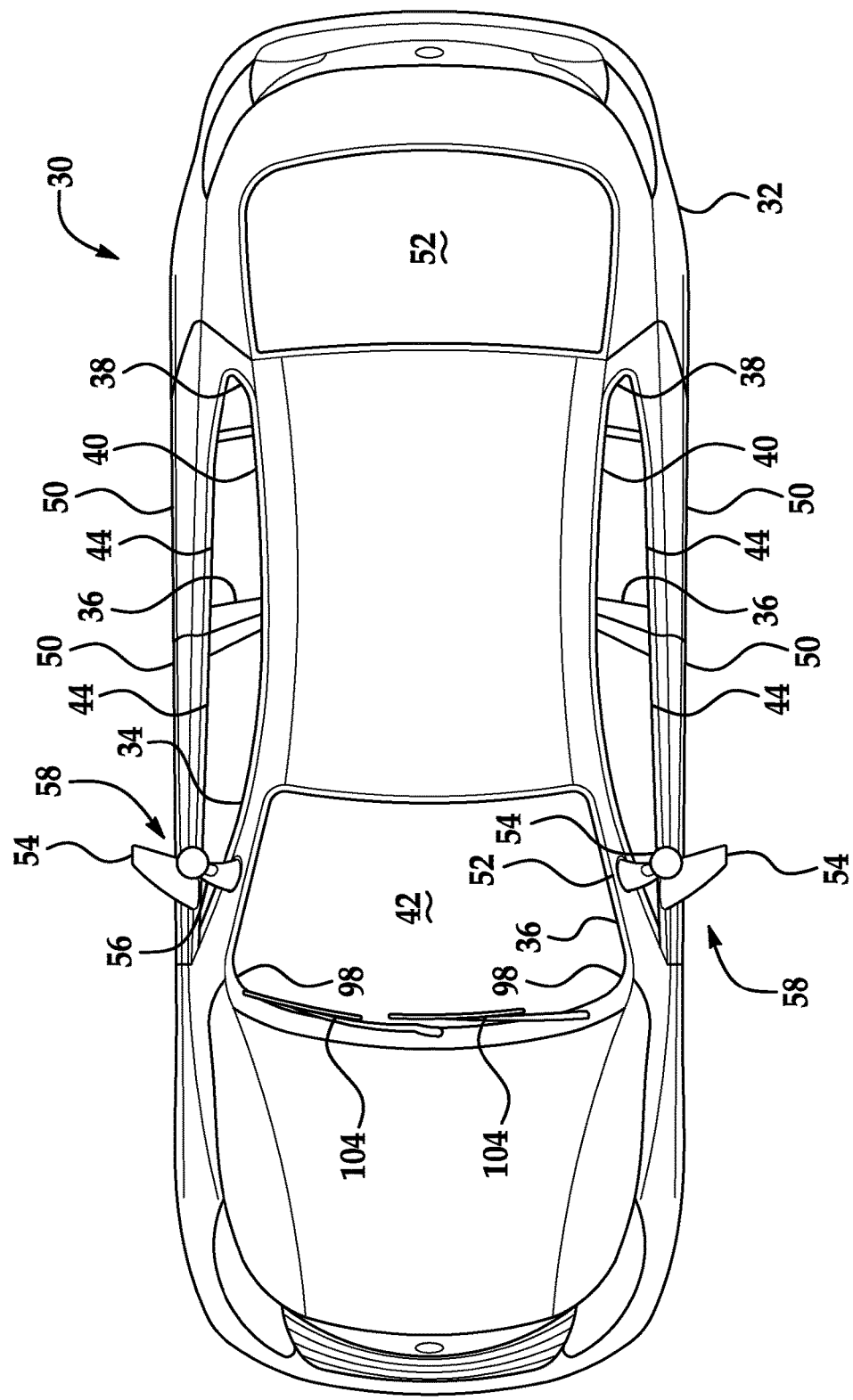
FIG. 2 is a top view of the vehicle.

With reference to FIGS. 1 and 2, a vehicle body 32 of a vehicle 30 may include A pillars 34, B pillars 36, C pillars 38, and roof rails 40. The A pillars 34 may extend between a windshield 42 and vehicle windows 44 and from a bottom end 46 at a bottom of the windshield 42 to a top end 48 at a top of the windshield 42. The B pillars 36 may extend between the vehicle windows 44 of adjacent doors 50. The C pillars 38 may extend between the vehicle windows 44 and a backlite 52. The vehicle body 32 may also include D pillars (not shown) if the vehicle 30 is, e.g., an SUV, crossover, minivan, or station wagon, in which case the C pillars 38 extend between the vehicle windows 44 of rear doors 50 and rear left and right vehicle windows 44, and the D pillars extend between the rear right and left vehicle windows 44 and the backlite 52. The roof rails 40 extend along the vehicle windows 44 from the A pillar 34 to the B pillar 36 to the C pillar 38.

The windshield 42 and vehicle windows 44 may be formed of any suitably durable transparent material, including glass such as laminated, tempered glass or plastic such as Plexiglas or polycarbonate. The windshield 42 is located adjacent the A pillars 34.

The vehicle 30 may include side-view mirrors 54. The side-view mirrors 54 may be located on the front doors 50 or on the vehicle body 32 near the bottom of the windshield 42. The side-view mirrors 54 may be visible to a human driver through the vehicle windows 44 and provide a reflected view from a vehicle-rearward direction to the driver.

With continued reference to FIGS. 1 and 2, an arm 56 extends from one of the pillars 34, 36, 38 of the vehicle 30, e.g., the A pillar 34, to a sensor assembly 58. The arm 56 may be located between the ends 46, 48 of the A pillar 34, that is, spaced from the bottom of the windshield 42 and from the top of the windshield 42, that is, spaced from the bottom end 46 and from the top end 48. The arm 56 may be attached to a bottom surface 62 of a first housing 60 of the sensor assembly 58. (The adjectives "first," "second," and "third" are used throughout this document as identifiers and are not intended to signify importance or order.) The arm 56 may have a tubular or other hollow shape, that is, a cavity may extend through the arm 56. The cavity may allow wiring, tubes, etc. to pass through the arm 56 while being shielded from the outside environment.

Figure 3:
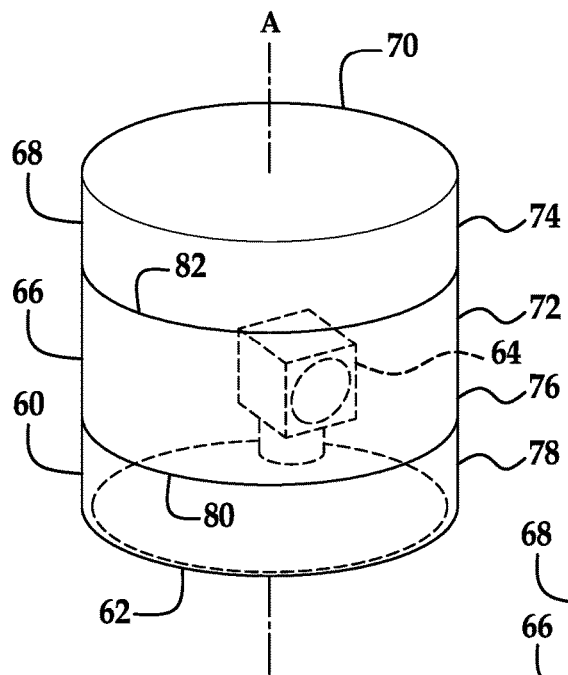
FIG. 3 is a perspective view of a sensor apparatus of the vehicle.

With reference to FIG. 3, the sensor assembly 58 typically includes the first housing 60, a sensor 64, a window 66, and a second housing 68. The sensor assembly 58 may have a cylindrical shape with a top surface 70, the bottom surface 62, and a side surface 72. The top surface 70 faces up, that is, in a vehicle-upward direction, and the bottom surface 62 faces down, that is, in a vehicle-downward direction. The cylindrical shape of the sensor assembly 58 defines an axis A, which runs through a center of the sensor assembly 58. The axis A is oriented vertically relative to the vehicle 30. The side surface 72 faces radially away from the axis A. The side surface 72 includes a first side surface 74 on the first housing 60, an outer surface 76 of the window 66, and a second side surface 78 on the second housing 68.

With reference to FIGS. 1 and 2, the sensor assembly 58 is attached to or mounted to the vehicle body 32. For example, the arm 56 may extend from the vehicle body 32 and support the first housing 60. The side-view mirrors 54 may be located below the sensor assemblies 58, that is, in a vehicle-downward direction from the sensor assemblies 58, and each bottom surface 62 may face the corresponding side-view mirror 54.

Figure 4:
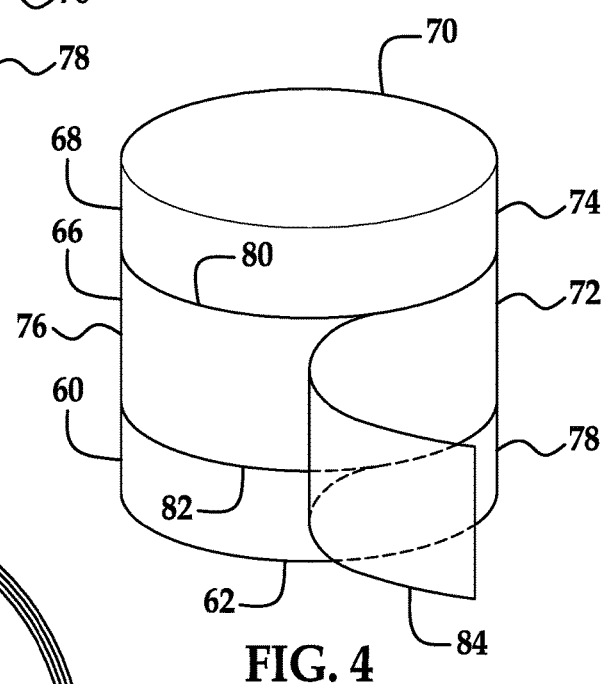
FIG. 4 is a perspective view of the sensor apparatus with a film partially removed.

With reference to FIGS. 3 and 4, the first housing 60 may include the bottom surface 62 and the first side surface 74. The first housing 60 may be cylindrical; for example, the bottom surface 62 may be flat and circular, and the first side surface 74 may extend perpendicular to the bottom surface 62 from a circumference of the bottom surface 62. The first housing 60 may support the sensor 64.

The sensor 64 is attached to the first housing 60. The sensor 64 may be designed to detect features of the outside world; for example, the sensor 64 may be a radar sensor, a scanning laser range finder, a light detection and ranging (LIDAR) device, or an image processing sensor such as a camera. In particular, the sensor 64 may be a LIDAR sensor. A LIDAR sensor detects distances to objects by emitting laser pulses and measuring the time of flight for the pulse to travel to the object and back. The laser pulses may have a wavelength of approximately 905 nanometers.

The window 66 is attached to the first housing 60 and to the second housing 68. A first end 80 of the window 66 may be attached to the first housing 60, and a second end 82 may be attached to the second housing 68. For example, the window 66 may be fastened to or adhered to the first and second housings 60, 68. For another example, the first and second housings 60, 68 may be attached to each other and extending about the window 66 so as to prevent the window 66 from moving relative to the housings 60, 68. For another example, the first and second housings 60, 68 may compress the window 66 between them, that is, may exert opposing compressive forces on the ends 80, 82 of the window 66.

The window 66 may be cylindrical and may define the axis A. The window 66 extends about the axis A. The window 66 may extend fully about the axis A, that is, 360°, or partially about the axis A. The window 66 extends along the axis A from the first end 80 to the second end 82. The first end 80 may touch the bottom surface 62 or may be spaced from the bottom surface 62 and touch the first side surface 74. The second end 82 may touch the top surface 70 or may be spaced from the top surface 70 and touch the second side surface 78. The window 66 has a diameter. The diameter of the window 66 may be less than the diameter of the first housing 60 and/or less than the diameter of the second housing 68. Alternatively or additionally, the diameter of the window 66 may be substantially equal to a diameter of the first housing 60 and/or to a diameter of the second housing 68; in other words, the window 66 may be flush or substantially flush with the side surface 72. "Substantially equal" and "substantially flush" mean the diameter of the window 66 is within 5% of the diameter of the first housing 60 or of the second housing 68.

At least some of the window 66 is transparent with respect to whatever phenomenon the sensor 64 is capable of detecting, e.g., infrared radiation, visible light, etc. For example, if the sensor 64 is a LIDAR sensor, then the window 66 is transparent with respect to light having a wavelength of approximately 905 nanometers. The window 66 may be formed of, e.g., glass such as laminated, tempered glass or plastic such as polycarbonate or acrylic.

With continued reference to FIGS. 3 and 4, the second housing 68 may include the top surface 70 and the second side surface 78. The second housing 68 may be cylindrical; for example, the top surface 70 may be flat and circular, and the second side surface 78 may extend perpendicular to the top surface 70 from a circumference of the top surface 70.

Figure 5:
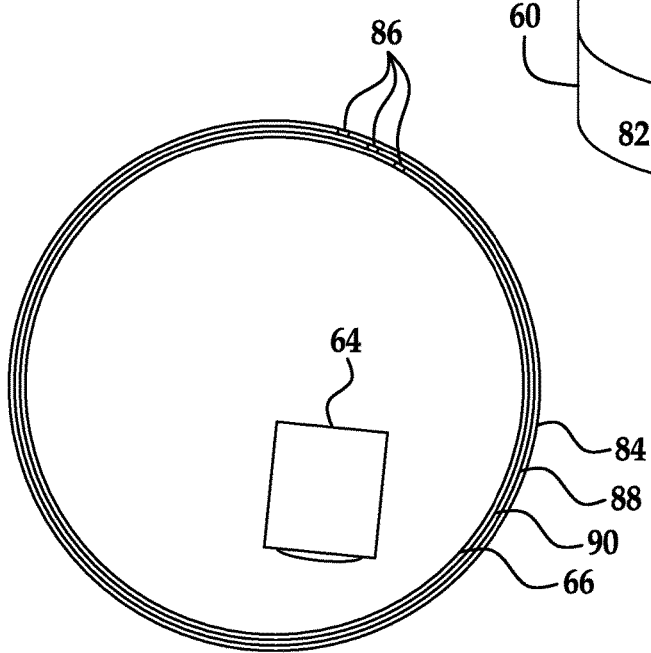
FIG. 5 is a cross-sectional view of the sensor apparatus.

With reference to FIGS. 4 and 5, a film 84 may cover the window 66. The film 84 may be in contact with the outer surface 76 of the window 66. The film 84 may extend fully or partially about the axis A. The film 84 may extend about the axis A from a seam 86 back to the seam 86, as shown in FIG. 5. Alternatively, the film 84 may extend more than fully about the axis A, that is, greater than 360°, and overlap itself. The film 84 may extend from the first end 80 to the second end 82 of the window 66. The film 84 may extend onto the first side surface 74 or second side surface 78, or the film 84 may cover only the window 66.

The film 84 may be formed of any material that is suitably transparent to the sensor 64 and suitably flexible to take the shape of the window 66, for example, polycarbonate, acrylic, poly(methyl methacrylate) (PMMA), polyurethane, etc. The film 84 may be approximately 1 millimeter thick.

The film 84 may be removable from the window 66. In other words, an operator may be able to peel the film 84 off the window 66 without damaging or permanently obscuring the window 66.

For example, the film 84 may be a cling film. In other words, the film 84 may bond to a surface such as the outer surface 76 of the window 66 via static electricity, that is, without adhesive.

Alternatively, the film 84 may include adhesive attaching the film 84 to the window 66. The adhesive may be a pressure-sensitive adhesive, in other words, an adhesive whose bonding is activated by applying pressure, as opposed to, e.g., curing. The adhesive may be a removable adhesive; that is, the bonding of the adhesive to the window 66 may be reversible. The adhesive may be bonded more strongly to the film 84 than to the window 66, and the adhesive may be bonded more strongly to itself than to the window 66; in other words, if the film 84 is removed from the window 66, the adhesive will stick to itself and to the film 84 rather than to the window 66. Thus, the adhesive will not leave residue on the window 66.

The film 84 may include a surface treatment. The surface treatment may be on an opposite side of the film 84 than the adhesive, if any. The surface treatment may be a hydrophobic coating, i.e., a coating repellent to water. The surface treatment may be an omniphobic coating, i.e., a coating repellent to water and to oily liquids. The surface treatment may be a superhydrophilic coating, i.e., a coating attractive to water such that a contact angle of water on the treated surface is less than 10°.

With reference to FIG. 5, the film 84 may be a first film 84 of a plurality of films 84, 88, 90 layered on the window 66. A second film 88 may cover the first film 84 and be removable from the first film 84. A third film 90 may cover the second film 88 and be removable from the second film 88. Each of the plurality of films 84, 88, 90 may have the same properties, for example, choice of material, surface treatment, having adhesive or being cling film, etc. Each of the films 84, 88, 90 may extend fully or partially about the axis A. Each of the films 84, 88, 90 may extend about the axis A from a respective seam 86 back to the seam 86, as shown in FIG. 5. The seams 86 may be offset from each other, that is, spaced from each other. Alternatively, each of the films 84, 88, 90 may extend more than fully about the axis A, that is, greater than 360°, and overlap itself.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor apparatus comprising:
    a housing;
    a LIDAR sensor attached to the housing;
    a cylindrical window attached to the housing and defining an axis;
    a first film covering the window, extending fully about the axis from a first seam back to the first seam, and removable from the window; and
    a second film covering the first film, extending fully about the axis from a second seam back to the second seam, and removable from the first film; and
    wherein the first seam and second seam are circumferentially spaced from each other around the axis.

2. The sensor apparatus of claim 1, wherein the housing is a first housing, further comprising a second housing, wherein the window is attached to the second housing.

3. The sensor apparatus of claim 2, wherein the first and second housings are cylindrical.

4. The sensor apparatus of claim 3, wherein a diameter of the window is less than a diameter of the first housing.

5. The sensor apparatus of claim 4, wherein the diameter of the window is less than a diameter of the second housing.

6. The sensor apparatus of claim 1, further comprising a third film covering the second film and removable from the second film.

7. The sensor apparatus of claim 1, wherein the first film is cling film.

8. The sensor apparatus of claim 1, wherein the first film includes adhesive attaching the film to the window.

9. The sensor apparatus of claim 8, wherein the adhesive is bonded more strongly to the first film than to the window.

10. The sensor apparatus of claim 1, wherein the first film includes a hydrophobic surface treatment.

11. The sensor apparatus of claim 1, further comprising a vehicle body, wherein the housing is mounted to the vehicle body.

12. A vehicle comprising:
    a vehicle body;
    a housing mounted to the vehicle body;
    a LIDAR sensor attached to the housing;
    a cylindrical window attached to the housing and defining an axis;
    a first film covering the window, extending fully about the axis from a first seam back to the first seam, and removable from the window; and
    a second film covering the first film, extending fully about the axis from a second seam back to the second seam, and removable from the first film; and
    wherein the first seam and second seam are circumferentially spaced from each other around the axis.

13. The vehicle of claim 12, wherein the vehicle body includes an A pillar, further comprising an arm extending from the A pillar to the housing.

14. The vehicle of claim 12, wherein the housing is a first housing, further comprising a second housing, wherein the window is attached to the second housing.

15. The vehicle of claim 12, wherein the first film is cling film.

16. The vehicle of claim 12, wherein the first film includes adhesive attaching the film to the window.

* * * * *